March 8, 1927.

R. S. BASSETT

LIQUID METER

Filed Aug. 28, 1925

1,620,151

WITNESSES:

Earl R. Ryder.
Chas. F. Bassett

INVENTOR

Robert S. Bassett

Patented Mar. 8, 1927.

1,620,151

UNITED STATES PATENT OFFICE.

ROBERT S. BASSETT, OF BUFFALO, NEW YORK.

LIQUID METER.

Application filed August 28, 1925. Serial No. 53,194.

My invention relates to improvements in liquid meters in which a register is driven by liquid operated mechanism and more particularly to such as are known as semi-positive meters in which the working joints of the liquid operated mechanism are kept semi-tight by a film of liquid retarded in its passage through said working joint by capillary attraction, or what is commonly called liquid packing.

The objects of my present invention are principally to provide means for closely adjusting such meters for as near absolute accuracy as possible, by providing a small compensating by-pass around the liquid operated mechanism of the meter and means of regulating the size of the opening in this by-pass and when regulated of sealing same.

I will now proceed to definitely describe the manner in which I have carried out my invention and then claim what I believe to be novel.

Figure 1:
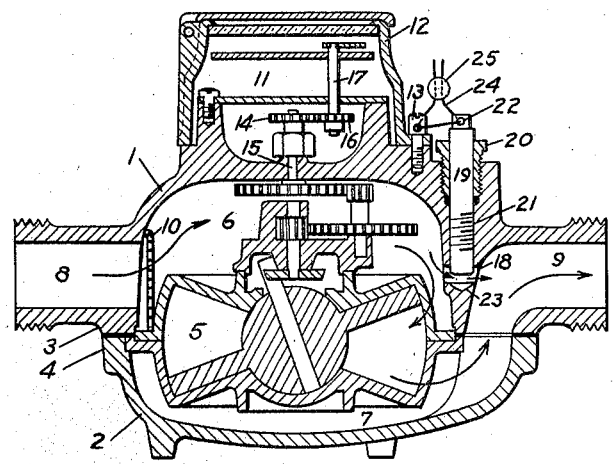
Figure 2:
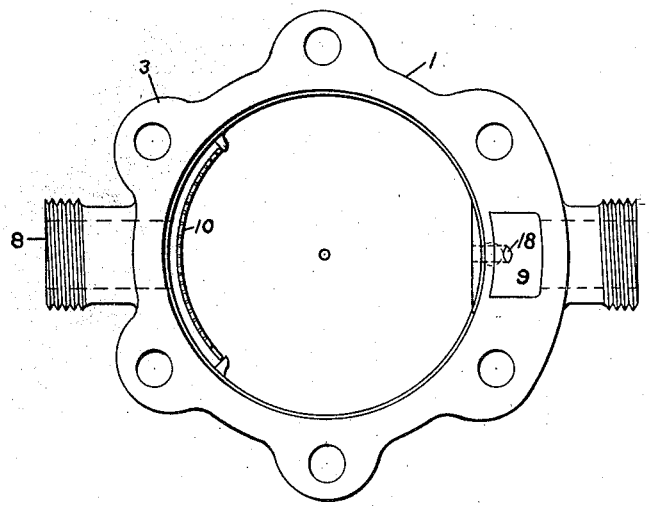

In the drawings, Figure 1 is a central vertical longitudinal section of my improved meter showing the interior working parts in place. Fig. 2 is a horizontal upward view of the upper section of the outside casing of the meter.

The outer casing of the meter is composed of two detachable parts, 1 and 2, which may be fastened together by bolts passing through the meeting flanges, 3 and 4. Between meeting flanges 3 and 4 is supported the liquid operated mechanism 5, which in this drawing is shown as of the well-known nutating disk piston type, and which divides the interior of the meter case into inlet chamber 6 and outlet chamber 7. The passage through inlet spud 8 communicates with inlet chamber 6 and the passage through outlet spud 9 communicates with outlet chamber 7. Strainer 10 is located in the upper outside casing 1.

Register 11 is located on the top of outer casing 1 and is not restricted to the exact type shown. Register 11 is shown covered by register box 12 which is fastened to the top of outer casing 1 by sealing screw 13. Meter change gear 14 is fastened to the upper end of stuffing box shaft 15, which is rotated by liquid operated mechanism 5.

Register change gear 16 is fastened to register shaft 17 and meshes with and is operated by meter change gear 14.

Compensating by-pass 18 extends from inlet chamber 6 to the passage in outlet spud 9. The location of passage 18 entirely in the upper outer casing 1 is the particular novel feature of my invention. Located in by-pass 18 is the adjustable valve 19, the upper end of which passes through stuffing box gland 20 and is provided with a device to prevent adjustment after sealing the meter. The method of sealing is not limited to the exact construction shown in which the stem of valve 19 is provided with adjusting screw threads 21 and sealing hole 22. In by-pass 18 is located valve seat 23 adapted to cooperate with valve 19.

Passing through sealing hole 22 in stem of valve 19 is sealing wire 24 sealed with lead seal 25.

In the application of my invention it is possible to quickly and easily compensate for an increase or a decrease in the seepage of the liquid being measured through the working liquid packed joints of the meter due to changes in the operating conditions. It is also possible to adjust the meter closer to absolute accuracy than can be done by means of change gears which usually will not allow an adjustment closer than one-half of one percent.

My invention is an improvement over previous devices in which the compensating by-pass is located in the lower outer casing of the meter or in which it is located in the upper outer casing of the meter and connected to the outlet spud in the lower outer casing by means of a passage in the lower outer casing. My invention greatly simplifies the manufacture of the compensating device in the meter, locates it at an accessible point and allows for the compensating device to be complete and entire in the upper outer casing alone without reference to the lower outer casing.

I claim:

A liquid meter comprising a liquid operated device, an indicating register operated by said device, a casing for said device including a bottom section and a top section separable from the bottom section, said top section having inlet and outlet openings, a compensating by-pass adapted to pass a portion of the liquid to be measured around said device and means to regulate the flow through said by-pass; substantially as and for the purpose described.

ROBT. S. BASSETT.

DISCLAIMER 1,620,151.—*Robert S. Bassett*, Buffalo, N. Y. LIQUID METER. Patent dated March 8, 1927. Disclaimer filed March 19, 1932, by the patentee.

Hereby enters this disclaimer in regard to certain constructions which might be considered to be covered by the claim as here explained in detail.

I hereby disclaim having invented a liquid meter having the inlet and outlet openings, compensating by-pass, and means to regulate the flow through said by-pass located other than all in the top section of the casing enclosing a liquid operated device.

I specifically disclaim my invention as covering a liquid meter having the inlet and outlet openings in the top section of the casing, and having the compensating by-pass and flow regulating means in elements other than this top section of the casing, such other possible elements being the bottom section of a two-part casing, or the central body section of a three-part casing made with a main body portion and separable top plate and bottom plate to enclose the liquid operated device.

I specifically disclaim my invention as covering the compensating by-pass as being located other than in the top section of the outer casing on which it is possible to mount an indicating register as shown in my patent drawing.

I, therefore, hereby disclaim any construction other than that which would be described by the claim if the word "and" is replaced in line three of the original claim between the third and fourth words to give the meaning covered by the specification and by the claim as originally intended in my original application.

[*Official Gazette April 12, 1932.*]